(12) United States Patent
Wilson (10) Patent No.: US 9,016,620 B2
(45) Date of Patent: Apr. 28, 2015

(54) AIRCRAFT LANDING GEAR ARRANGEMENT AND A NOSE LANDING GEAR ASSEMBLY

(75) Inventor: Fraser Wilson, Filton Bristol (GB)

(73) Assignee: Airbus Operations Limited, Bristol (GB)

(*) Notice: Subject to any disclaimer, the term of this patent is extended or adjusted under 35 U.S.C. 154(b) by 838 days.

(21) Appl. No.: 12/922,941

(22) PCT Filed: Mar. 31, 2009

(86) PCT No.: PCT/GB2009/050314
§ 371 (c)(1),
(2), (4) Date: Dec. 10, 2010

(87) PCT Pub. No.: WO2009/125213
PCT Pub. Date: Oct. 15, 2009

(65) Prior Publication Data
US 2011/0089289 A1 Apr. 21, 2011

Related U.S. Application Data

(60) Provisional application No. 61/044,669, filed on Apr. 14, 2008.

(30) Foreign Application Priority Data

Apr. 11, 2008 (GB) .................................. 0806660.7

(51) Int. Cl.
*B64C 25/50* (2006.01)
*B64C 25/40* (2006.01)
*B64C 25/42* (2006.01)

(52) U.S. Cl.
CPC ............... *B64C 25/405* (2013.01); *B64C 25/42* (2013.01); *Y02T 50/823* (2013.01)

(58) Field of Classification Search
USPC ...... 244/50, 100 R, 102 R, 103 R, 103 S, 111
See application file for complete search history.

(56) References Cited

U.S. PATENT DOCUMENTS 3,807,664 A * 4/1974 Kelly et al. ...................... 244/50
3,932,568 A * 1/1976 Watts et al. .................. 264/29.7

(Continued)

FOREIGN PATENT DOCUMENTS

| EP | 1867567 | 12/2007 |
|---|---|---|
| WO | 9529094 | 11/1995 |
| WO | 2007048164 | 5/2007 |

OTHER PUBLICATIONS

"B737NG Briefings, Rejected Takeoff", Jan. 2008, Smart Cockpit, All Pages.*
International Search Report for PCT/GB2009-050314 mailed Sep. 29, 2009.
Written Opinion of the International Searching Authority for PCT/GB2009-050314 mailed Sep. 29, 2009.

*Primary Examiner* — Philip J Bonzell
*Assistant Examiner* — Nicholas McFall
(74) *Attorney, Agent, or Firm* — Lowe Hauptman & Ham, LLP (57) ABSTRACT

An aircraft landing gear arrangement comprises a nose landing gear assembly and at least one main landing gear assembly. The nose landing gear assembly has a nose landing gear wheel with a high energy brake apparatus therein. The main landing gear assembly has a main landing gear wheel with a high energy brake apparatus therein and a main landing gear wheel with a motor therein. The motor is used for driving the main landing wheel during taxiing of the aircraft.

24 Claims, 6 Drawing Sheets (56) References Cited

U.S. PATENT DOCUMENTS 6,420,854 B1 * 7/2002 Hughes et al. ................ 320/165

2006/0038068 A1 * 2/2006 Sullivan ........................ 244/111
2007/0048164 A1 3/2007 Demetriou et al.

* cited by examiner

AIRCRAFT LANDING GEAR ARRANGEMENT AND A NOSE LANDING GEAR ASSEMBLY

RELATED APPLICATIONS

The present application is a national phase of PCT/GB2009/050314, filed Mar. 31, 2009, and is based on Great Britain Application Number 0806660.7, filed Apr. 11, 2008.

FIELD OF THE INVENTION

The present invention relates to an aircraft landing gear arrangement particularly but not exclusively for use in a so-called tricycle aircraft landing gear arrangement with a single nose landing gear assembly and two spaced main landing gear assemblies.

BACKGROUND OF THE INVENTION

When aircraft are moved on the ground they are conventionally either towed by a tow tractor or are powered by the propulsive force of their own main engines (i.e. the same engines that are used during flight).

As aircraft engines are optimised for the flight phase of their operation it is recognised that it would be desirable to reduce the use of the main engines to propel the aircraft on the ground. More specifically, there is believed to be a direct fuel burn saving to an aircraft if the engines are not running during the taxi phase. There may also be an additional gain in efficiency from more accurately predicting the fuel consumption during taxi phase and thereby enabling the fuel carried during flight to be reduced. Reducing the use of engines during taxi is also desirable to reduce the local emissions while the aircraft is on the ground and/or to reduce noise emissions during ground operations.

While conventional towing offers some of these advantages its use as a means for ground movement, particularly for commercial aircraft, is often limited due to the structural impact upon the landing gear of the aircraft (typically the nose landing gear). For example, older aircraft may not have been designed for extended towing operation as this would impose a significant weight penalty (due to the need to increase the weight of the landing gear structure to accommodate extra loads) and, therefore, the use of towing must be limited in order to avoid a reduction in the life of the landing gear. As such the use of towing to move an aircraft is often limited to use for either short distances or when the aircraft is only lightly loaded. For example towing is commonly used at a departure gate to push an aircraft back into a taxi area (i.e. relatively short distance) or may be used when an aircraft is being serviced (i.e. relatively low aircraft weight). For longer distance or higher weight operations such as the taxi phase prior to take off (i.e. relatively high weight and relatively long distance) and the taxi phase after landing, the aircraft's engines are used to propel the aircraft.

Accordingly, it has been proposed to provide a drive system inside, or in close proximity to, the nose wheel of an aircraft in order to enable the aircraft to be moved during taxiing or other ground handling operations of an aircraft without the use of the main aircraft engines and without the need to be dependent upon an external means such as a tow truck. An example of such a system has been proposed by WheelTug Plc. Such systems may present an additional benefit over the use of conventional systems and a tow tractor since they may allow the aircraft fully autonomous operation removing the potential for delays, for example when waiting for a tow truck during push back.

The reduction of the use of the main engines for during ground operation may be particularly desirable on short-haul aircraft where a larger proportion of the aircrafts operational time is spent in taxi and other ground handling operations. In a long haul aircraft the additional fuel burn penalty of the extra weight of a drive system may make the benefits less desirable.

Most aircraft have brakes on some or all of the main landing gear wheels. Additional brakes on the nose landing gear wheels are common, but occasionally feature as optional equipment. The additional nose landing gear brakes enable shorter stopping distances, particularly after a rejected take-off (RTO).

It has previously been proposed that passenger aircraft in the 100-200 passenger range with a tricycle landing gear configuration can be driven during taxiing without main engines by motors mounted on the nose landing gear, normally within the nose landing gear wheels. However, the problem with this arrangement is that there is insufficient traction between the nose landing gear wheels and the taxiway to move an aircraft via a nose wheel drive in anything other than ideal conditions. If the centre of gravity of the aircraft is aft of its optimum, if the aircraft has to travel uphill, if there are headwinds or if the surface is slippery, then insufficient traction exists to drive the aircraft.

It is an object of the invention to provide an improved aircraft landing gear arrangement.

SUMMARY OF THE INVENTION

According to a first aspect of the invention there is provided an aircraft landing gear arrangement comprising a nose landing gear assembly and at least one main landing gear assembly, the nose landing gear assembly having a nose landing gear wheel with a high energy brake apparatus arranged therein, the main landing gear assembly having a main landing gear wheel with a high energy brake apparatus arranged therein and a main landing gear wheel with a motor for driving that main landing gear wheel during taxiing of the aircraft.

In that way, the main landing gear wheel can be used to house the motor. The main landing gear wheels support a considerably larger proportion of the aircraft weight, resulting in increased traction so that the motors arranged in the main landing gear wheels can effect driving of the aircraft during taxiing. By providing a high energy braking apparatus in the nose landing gear wheel, the reduced braking effectiveness of the main landing gear wheels is mitigated. Where two main landing gear assemblies are provided, both may have two landing gear wheels with a high energy brake apparatus in one wheel and a motor in the other.

By "high energy braking" we mean braking on normal landing or on a rejected take-off.

The nose landing gear wheel is preferably arranged with an offset hub to accommodate the high energy braking apparatus.

The motor preferably provides a braking function for use during taxiing. Also, the motor may include means to store energy from braking on landing and to allow re-use of that energy during taxiing. For example, the motor may be an electric motor which may be engaged during landing so as to provide a supplementary braking function, which supplementary braking would effect a generation of electricity. That electricity may be stored in batteries or a high capacity capacitor for re-use during taxiing. Alternatively, the motor may comprise a hydraulic motor.

According to a second aspect of the invention, there is provided, an aircraft landing gear arrangement comprising at least two main landing gear assemblies connected to the wings or fuselage of the aircraft and a single nose landing gear assembly connected to the fuselage proximal to the nose of the aircraft, each landing gear assembly comprising at least one wheel, wherein at least one of the main landing gear assemblies comprises a drive system arranged to rotatably drive at least one wheel of said main landing gear assembly.

BRIEF DESCRIPTION OF THE DRAWINGS

An aircraft landing gear arrangement in accordance with the invention will now be described in detail by way of example and with reference to the accompanying drawings, in which.

DETAILED DESCRIPTION OF THE EMBODIMENT

Figure 1:
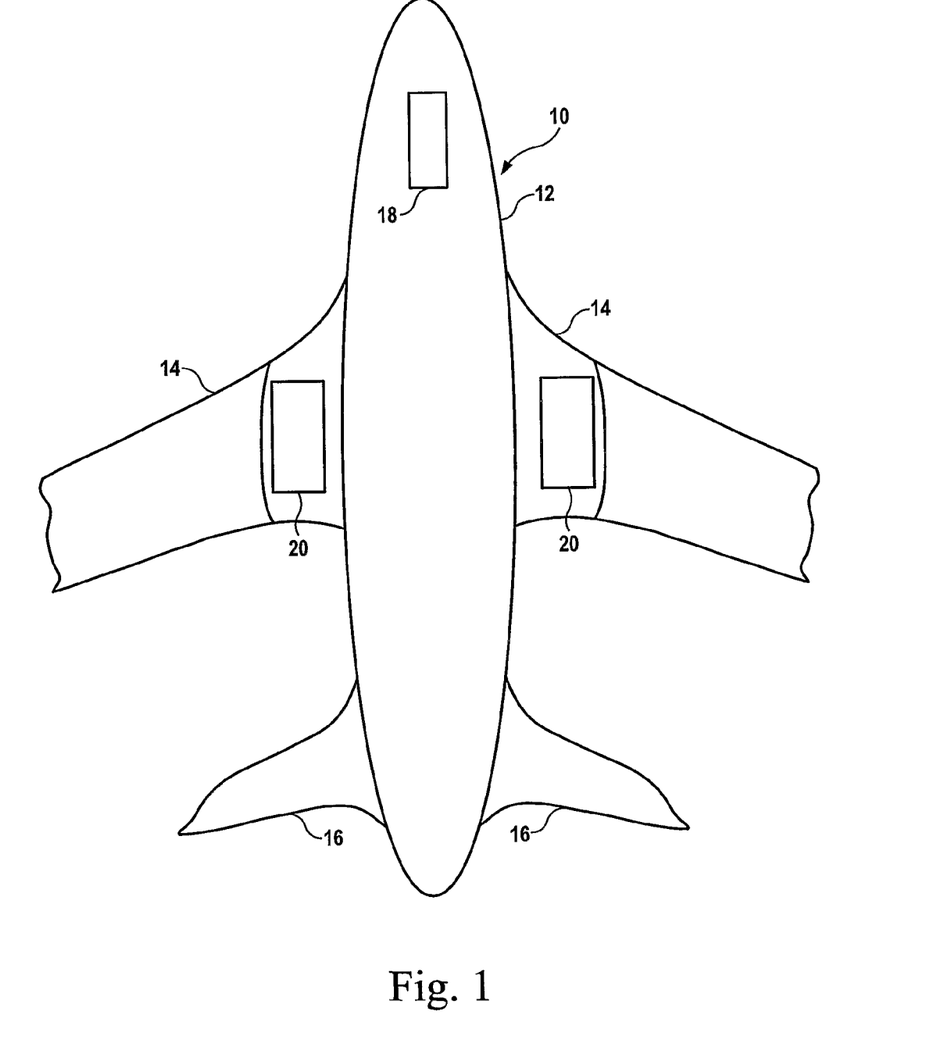
FIG. 1 is a schematic underside elevation of a passenger aircraft illustrating a typical tricycle landing gear arrangement.

In FIG. 1, an aircraft 10 comprises a fuselage 12, wings 14 and a tail plane 16. A nose landing gear assembly 18 is arranged within a nose box of the fuselage 12 and two main landing gear assemblies are arranged at around the mid point of the fuselage either in the fuselage itself or, as shown in FIG. 1, in reinforced nacelles at the roots of the wings 14.

Figure 2:
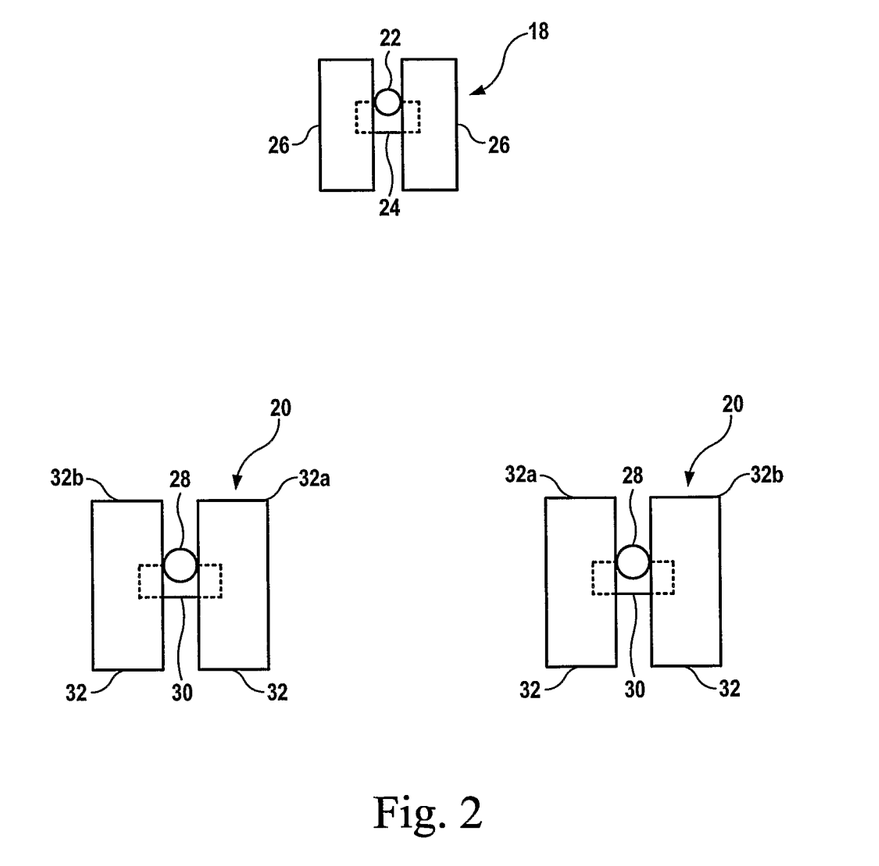
FIG. 2 is a schematic plan view of the nose landing gear assembly and two main landing gear assemblies in accordance with the present invention.

FIG. 2 illustrates an aircraft landing gear assembly in accordance with the invention in schematic plan form. In FIG. 2, the nose landing gear comprises a retractable landing gear stay 22 which carries an axle 24. The axle 24 has opposite ends which, respectively, mount nose landing gear wheels 26. The nose landing gear wheels 26 are shown in more detail in FIG. 5.

Each main landing gear assembly 20 comprises a main landing gear stay 28 which carries a main landing gear axle 30. The main landing gear axle 30 has opposite ends which carry, rotatably, main landing gear wheels 32.

In a conventional main landing gear assembly both wheels 32 would have a high energy brake apparatus of known form arranged within the wheel. In the case of the present invention, however, the inboard wheels 32a have an electric motor apparatus arranged within the wheel while the outboard wheels 32b have conventional high energy braking apparatus.

Figure 3:
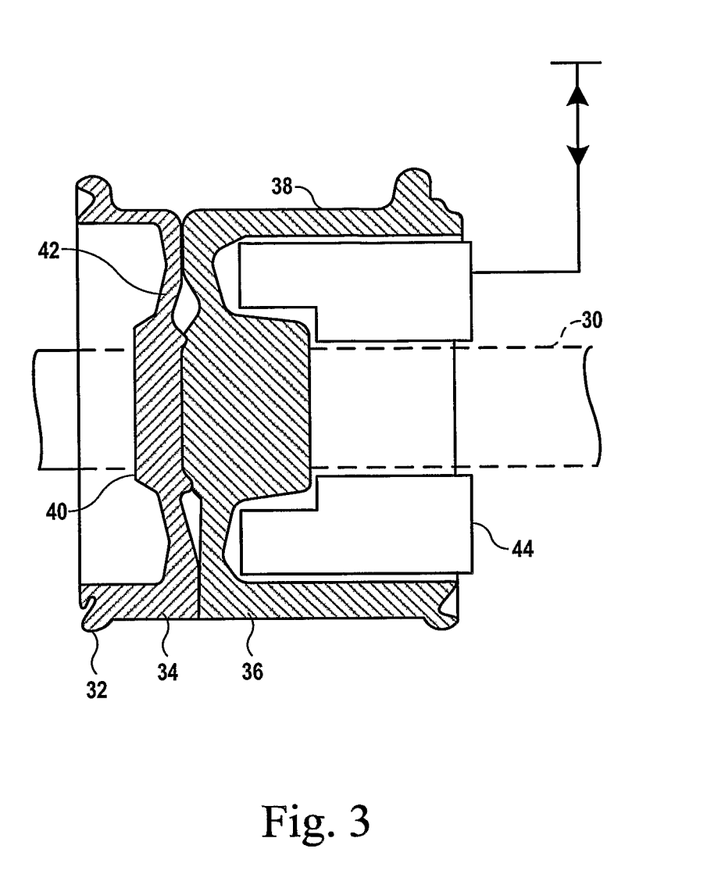
FIG. 3 is a schematic section through a main landing gear wheel for use in the arrangement of FIG. 2.

In FIG. 3, a main landing gear wheel 32 is shown in a schematic section. In particular, the wheel 32 shown in FIG. 3 is the inboard wheel 32a of the right hand wheel pair shown in FIG. 2.

The wheel 32 shown in FIG. 3 is a typical main landing gear wheel comprising two parts 34, 36 which are secured together with fasteners (not shown). The two parts 34, 36, when fastened together, define a rim 38 and a hub 40 connected by means of an annular web 42 to the rim 38.

Both parts 34, 36 are cup-like with a circular base and a cylindrical wall extending from the base so as to define the rim 38. The part 34 is considerably shallower than the part 36 so that when the parts are assembled together, the hub 40 is offset relative to the mid point of the wheel 32 in the axial direction thereof. That provides a relatively deep space within part 36 which normally accommodates a high energy braking apparatus. In the present invention, however, the high energy braking apparatus is not present and the space vacated by that apparatus is instead taken up by an electric motor 44. The electric motor is mounted to the main landing gear stay 28 and is connected in a drivable fashion to the axle 30.

The electric motor 44 is sufficiently highly powered to effect driving of the wheel 32 and, as stated above, the main landing gear wheels 32 have sufficient traction to drive the aircraft 10 while taxiing under most operating conditions.

Figure 6:
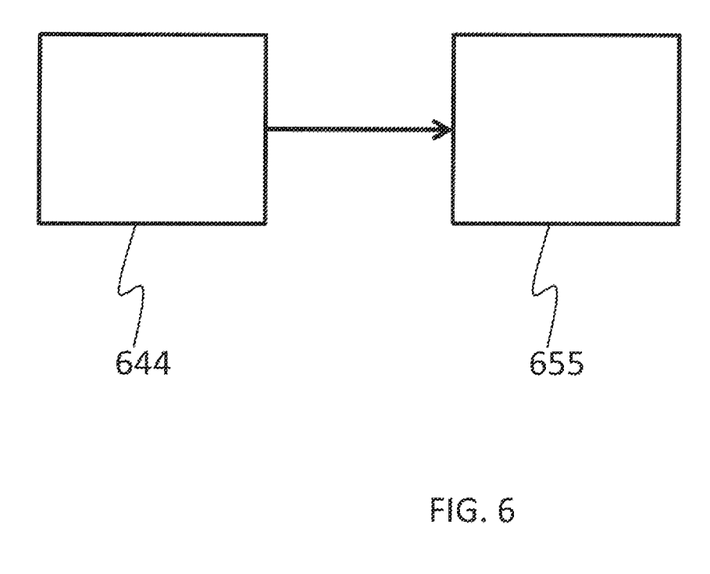
FIG. 6 is a schematic of an aircraft landing gear arrangement according to an exemplary embodiment.
Figure 7:
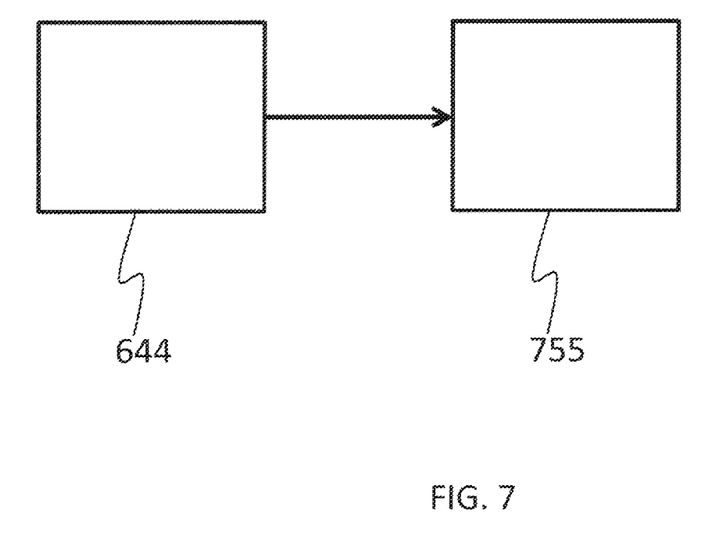
FIG. 7 is a schematic of an aircraft landing gear arrangement according to another exemplary embodiment.

Also, when the aircraft lands, the electric motor 44 is switched to a braking mode to facilitate the landing braking effort. In that arrangement the axle 30 drives the electric motor 44 so that the motor 44 acts as a generator. The electricity generated by the braking effect can be stored within appropriate electrical storage on the aircraft for re-use during taxiing, for example in a battery 655 or a high capacity capacitor 755, as is depicted in black-box format in FIGS. 6 and 7, where 644 corresponds to the electric motor in braking mode, and where the arrow indicates electricity flow.

Figure 4:
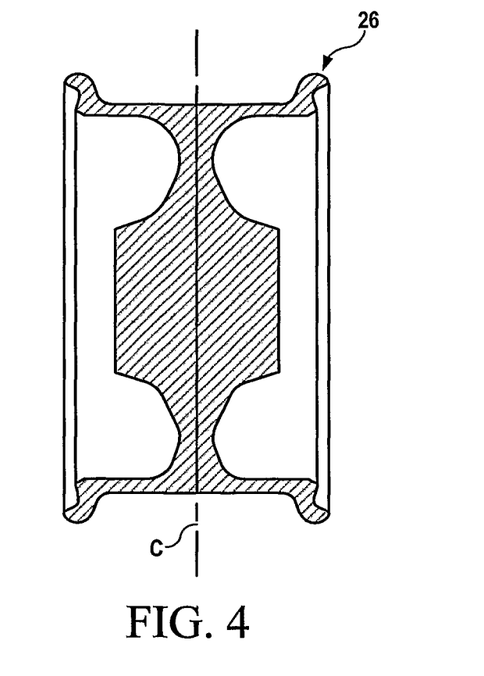
FIG. 4 is a schematic section through a typical nose landing gear wheel.

Unlike conventional main landing gear wheels, as shown in FIG. 3, conventional nose landing gear wheels tend to be generally symmetrical about the centreline C of the wheel in the axial direction (see FIG. 4).

Figure 5:
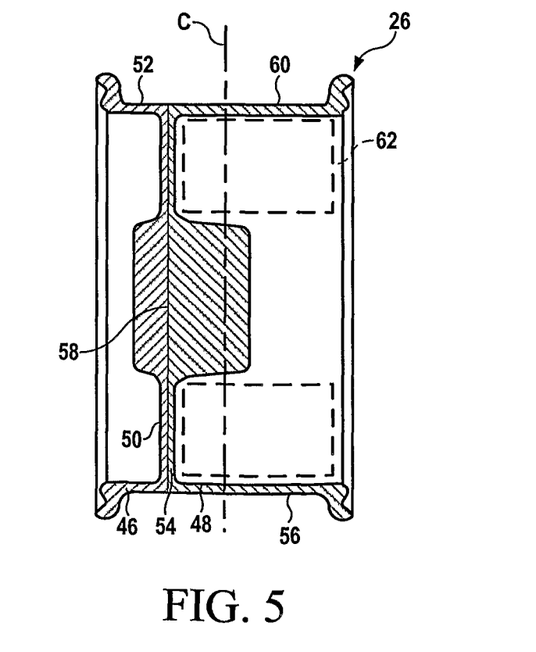
FIG. 5 is a schematic section through a nose landing gear wheel for use in the aircraft landing gear arrangement in accordance with the invention.

In the present invention, an alternative nose landing gear arrangement is proposed in which the nose landing gear wheel has an offset hub similar to the main landing gear wheel. This arrangement is shown in FIG. 5. In FIG. 5, the nose landing gear wheel 26 comprises a first part 46 and a second part 48. The first part 46 has a generally circular base 50 with a cylindrical wall 52 extending outwardly therefrom. The part 48 also has a circular base 54 with a cylindrical wall 56 extending outwardly therefrom. The cylindrical wall 56 is substantially deeper than the cylindrical wall 52 of the part 46. However, the overall axial length of the wheel 26 remains the same. Circular bases 50, 54 define the hub 58 and the cylindrical walls 52, 56 define the rim 60. Consequently, the hub 58 is substantially offset relative to the centreline C of the wheel 26 in the axial direction. By making the hub 58 offset in the axial direction, a space is made available to provide a high energy braking apparatus in the nose landing gear wheel 26 to assist with the main braking effort on landing or an RTO. A high energy braking apparatus 62 is shown in broken lines in FIG. 5 and is of conventional form, although adapted to fit into the smaller space envelope defined by the smaller nose landing gear wheel 26.

The present invention enables an aircraft to taxi without using its main engines by the installation of electric or hydraulic motor in the main landing gear wheels. The provision of the high energy braking apparatus in the nose landing gear mitigates the reduction in braking caused by replacement of one of the high energy braking apparatus in the main landing gear with the motor. Aircraft taxiing without the use of main engines gives considerable advantages, for example reduced noise, reduced fuel usage and carbon dioxide emissions on the ground, improved brake life and improved aircraft turnaround time. The motors also have a braking function which is generally anticipated to be of most use during taxiing. That reduces wear on the main brakes during taxiing. It is believed that a disproportionate amount of brake wear occurs during aircraft taxiing.

Although the invention has been described above with reference to one or more preferred embodiments, it will be appreciated that various changes or modifications may be made without departing from the scope of the invention. For example any type of motor may be used in place of the electric motor. Additionally, a drive train may be used between the motor and wheels to provide a gear reduction/torque increase or clutch facility for disengagement e.g. during take off and landing.

The invention claimed is:

1. An aircraft landing gear arrangement comprising a nose landing gear assembly and at least one main landing gear assembly, the nose landing gear assembly having a nose landing gear wheel and a brake apparatus configured for rejected take-off braking, the nose landing gear wheel includes a hub offset relative to a rotational centreline of the wheel in an axial direction, and a rim co-axial with the hub and the brake apparatus fully disposed within the nose landing gear wheel, wherein the nose landing gear wheel comprises a first part and a second part attached to the first part, where the first part includes a cylindrical wall which is deeper than a cylindrical wall of the second part, the main landing gear assembly having a main landing gear wheel with a braking apparatus arranged therein and another main landing gear wheel with a motor arranged therein for driving that main landing gear wheel during taxiing of the aircraft.

2. An aircraft landing gear arrangement according to claim 1 in which two main landing gear assemblies are provided, both main landing gear assemblies having two main landing gear wheels with a braking apparatus configured for rejected take-off braking arranged in one wheel and a motor arranged in the other wheel respectively.

3. An aircraft landing gear arrangement according to claim 1 in which the motor provides a braking function.

4. An aircraft landing gear arrangement according to claim 3 in which the motor is arranged to store energy during braking for later re-use.

5. An aircraft landing gear arrangement according to claim 1 in which the motor is an electric motor.

6. An aircraft landing gear arrangement according to claim 5 in which the electric motor provides a braking function and generates electrical energy during that braking function, the electric energy being stored in appropriate electrical energy storage on the aircraft.

7. An aircraft landing gear arrangement according to claim 6 in which the electrical energy storage comprises a battery.

8. An aircraft landing gear arrangement according to claim 7 in which the electrical energy storage comprises a capacitor.

9. An aircraft landing gear arrangement according to claim 1, wherein only main landing gear assemblies include a respective motor for driving a respective main landing gear wheel.

10. An aircraft landing gear arrangement according to claim 1, wherein the nose landing gear does not include a motor for driving a wheel thereof.

11. An aircraft landing gear arrangement comprising at least two main landing gear assemblies connected to the wings or fuselage of the aircraft and a single nose landing gear assembly connected to the fuselage proximal to the nose of the aircraft, each landing gear assembly comprising at least one wheel, wherein at least one of the main landing gear assemblies comprises a drive system arranged to rotatably drive at least one wheel of said main landing gear assembly, wherein
the nose landing gear assembly includes a nose landing gear wheel with a brake apparatus configured for rejected take-off braking,
the nose landing gear wheel includes a hub offset relative to a notional centreline of the wheel in an axial direction, and a rim co-axial with the hub and the brake apparatus fully disposed within the nose landing gear wheel, and
the nose landing gear wheel comprises a first part and a second part attached to the first part, where the first part includes a cylindrical wall which is deeper than a cylindrical wall of the second part.

12. An aircraft landing gear arrangement comprising a nose landing gear assembly and at least one main landing gear assembly, the nose landing gear assembly having a nose landing gear wheel with a brake apparatus configured for rejected take-off braking, the nose landing gear wheel includes a hub offset relative to a notional centreline of the wheel in an axial direction, and a rim co-axial with the hub and the brake apparatus fully disposed within the nose landing gear wheel, wherein the nose landing gear wheel comprises a first part and a second part attached to the first part, where the first part includes a cylindrical wall which is deeper than a cylindrical wall of the second part, the main landing gear assembly having a main landing gear wheel with a braking apparatus configured for rejected take-off braking arranged therein and a main landing gear wheel with a motor arranged therein for driving that main landing gear wheel during taxiing of the aircraft.

13. An aircraft landing gear arrangement according to claim 12, wherein (i) the main landing gear wheel with a brake apparatus configured for rejected take-off braking arranged therein and (ii) the main landing gear wheel with a motor arranged therein for driving that main landing gear wheel during taxiing of the aircraft, are separate landing gear wheels.

14. An aircraft landing gear arrangement according to claim 12, the hub being offset relative to a notional centreline of the wheel in the axle direction.

15. An aircraft landing gear arrangement comprising:
a nose landing gear assembly, the nose landing gear assembly having a nose landing gear wheel and a brake apparatus configured for rejected take-off braking to brake the nose landing gear wheel, wherein the nose landing gear wheel includes a hub offset relative to a notional centreline of the wheel in an axial direction, and a rim co-axial with the hub and the brake apparatus fully disposed within the nose landing gear wheel, wherein the nose landing gear wheel comprises a first part and a second part attached to the first part, where the first part includes a cylindrical wall which is deeper than a cylindrical wall of the second part; and
least one main landing gear assembly having a first main landing gear wheel and a second main landing gear wheel, the main landing gear assembly including a brake apparatus configured for rejected take-off braking to brake the first main landing gear wheel and a motor configured to drive the second main landing gear wheel during taxiing of the aircraft.

16. An aircraft landing gear arrangement according to claim 15 in which a second main landing gear assembly is provided, the second main landing gear assembly including a third main landing gear wheel and a fourth main landing gear wheel, the second main landing gear assembly including a second brake apparatus configured for rejected take-off braking to brake the third main landing gear wheel and a second motor configured to drive the fourth main landing gear wheel during taxiing of the aircraft.

17. An aircraft landing gear arrangement according to claim 15 in which the motor provides a braking function.

18. An aircraft landing gear arrangement according to claim 17 in which a component is arranged to store energy generated by the motor during braking for later re-use.

19. An aircraft landing gear arrangement according to claim 15, wherein only main landing gear assemblies include a respective motor for driving a respective main landing gear wheel.

20. An aircraft landing gear arrangement according to claim 15, wherein the nose landing gear does not include a motor for driving a wheel thereof.

21. An apparatus, comprising:
an aircraft having the landing gear arrangement of claim 1.

22. An apparatus, comprising:
an aircraft having the landing gear arrangement of claim 12.

23. An apparatus, comprising:
an aircraft having the landing gear arrangement of claim 15.

24. An aircraft landing gear arrangement according to claim 15, wherein the wheel includes a hub and a rim co-axial with the hub.

* * * * *